US007746015B2

(12) United States Patent
Bruno

(10) Patent No.: US 7,746,015 B2
(45) Date of Patent: Jun. 29, 2010

(54) METHOD FOR FEEDING AN OPERATING MOTOR OF A ROLLING SHUTTER AND A DEVICE FOR A DRIVEN ROLLING SHUTTER

(75) Inventor: Serge Bruno, Marnaz (FR)

(73) Assignee: Somfy SAS, Cluses (FR)

( * ) Notice: Subject to any disclaimer, the term of this patent is extended or adjusted under 35 U.S.C. 154(b) by 152 days.

(21) Appl. No.: 11/791,633

(22) PCT Filed: Dec. 6, 2005

(86) PCT No.: PCT/IB2005/003679

§ 371 (c)(1),
(2), (4) Date: May 25, 2007

(87) PCT Pub. No.: WO2006/061691

PCT Pub. Date: Jun. 15, 2006

(65) Prior Publication Data

US 2008/0191658 A1 Aug. 14, 2008

(30) Foreign Application Priority Data

Dec. 7, 2004 (FR) .................................. 04 13016

(51) Int. Cl.
*H02P 1/04* (2006.01)
*H02P 5/00* (2006.01)
*G05D 3/00* (2006.01)

(52) U.S. Cl. ...................................... 318/466; 318/468

(58) Field of Classification Search ................. 318/466, 318/468

See application file for complete search history.

(56) References Cited

U.S. PATENT DOCUMENTS 4,289,995 A * 9/1981 Sorber et al. ................... 318/9
4,422,030 A 12/1983 McAllise
5,621,295 A 4/1997 Vanderschaeghe et al.
6,777,902 B2 8/2004 Fitzgibbon et al.
6,936,987 B2 8/2005 Cheron
2005/0156546 A1 7/2005 Keller et al.

FOREIGN PATENT DOCUMENTS

DE 3933266 A 1/1991
DE 4307096 A 9/1994
DE 20002225 U 5/2000
EP 0 671 542 A 9/1995
EP 0 808 986 A 11/1997

(Continued)

*Primary Examiner*—Walter Benson
*Assistant Examiner*—Erick Glass
(74) *Attorney, Agent, or Firm*—Frommer Lawrence & Haug LLP; Ronald R. Santucci

(57) ABSTRACT

The inventive method makes it possible to feed an alternating current electric motor used for operating a rolling shutter in a building by means of a gear whose performance substantially varies when a movable element drives or is driven by the rolling shutter. The electric motor is supplied, in certain phases, at a reduced tension, wherein the motor slipping measuring a relative speed deviation with respect to a zero running torque speed remains less the motor slipping when the rotor thereof ruts at a nominal speed at least if the rolling shutter does not meet obstacles. The drive for the rolling shutter for carrying out said method is also disclosed.

18 Claims, 2 Drawing Sheets

FOREIGN PATENT DOCUMENTS

| | | | |
|---|---|---|---|
| EP | 0 808 986 | B | 2/2003 |
| EP | 1 349 028 | A | 10/2003 |
| FR | 2 814 298 | | 3/2002 |
| GB | 923920 | | 5/1963 |
| GB | 1 201 508 | | 8/1970 |

* cited by examiner

Fig. 2
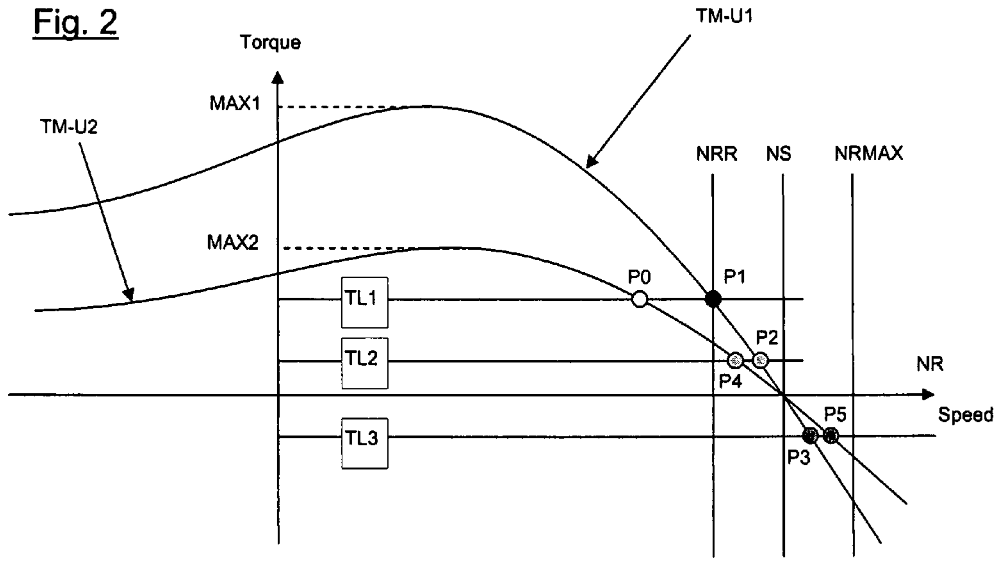
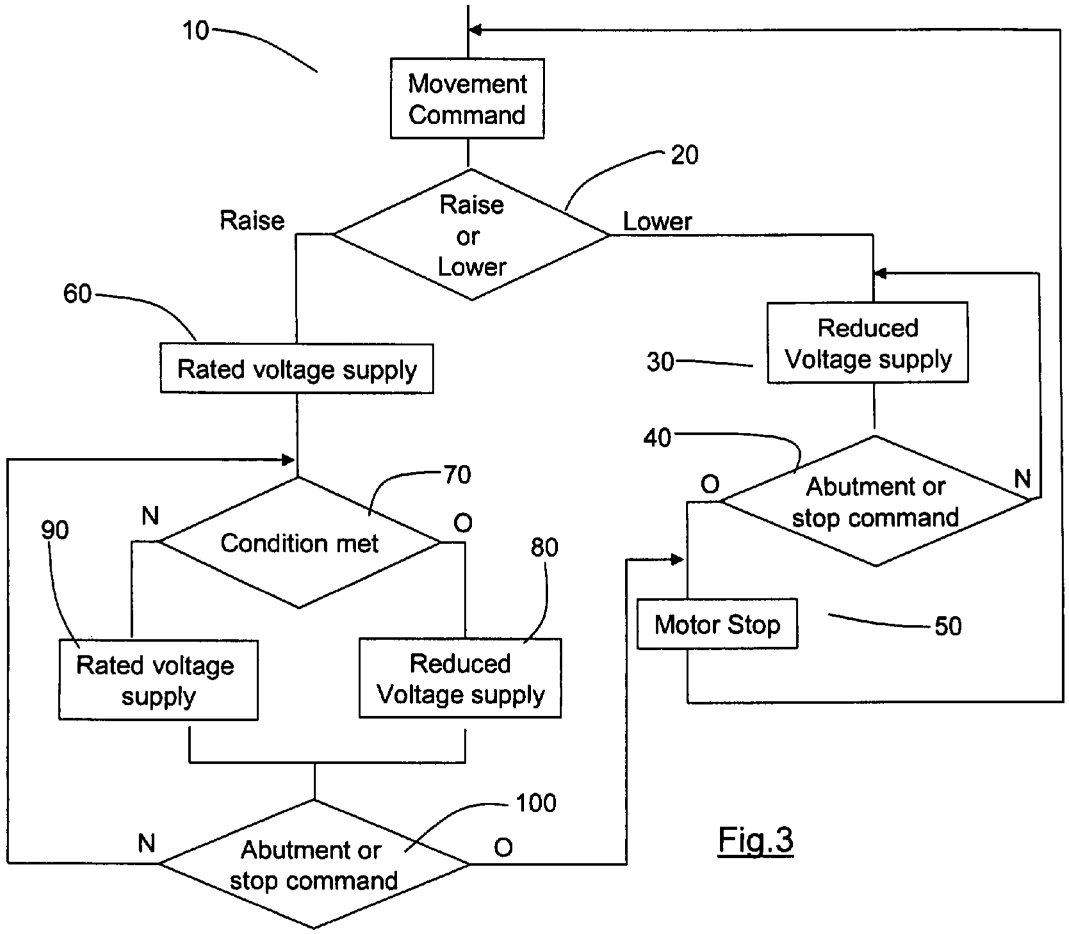
Fig.3

METHOD FOR FEEDING AN OPERATING MOTOR OF A ROLLING SHUTTER AND A DEVICE FOR A DRIVEN ROLLING SHUTTER

This application is a 371 of PCT/IB2005/003679 filed Dec. 6, 2005, published on Jun. 15, 2006 under publication number WO 2006/061691 A1 which claims priority benefits from French Patent Application Number 04 13016 filed Dec. 7, 2004, the entire disclosure of which is hereby incorporated by reference.

The invention relates to a method for supplying an alternating current electric motor used to operate a movable element for closure, privacy, sun protection or screening in a building. It also relates to an actuator and an installation using such a method.

Some actuators designed to be installed in buildings and designed to operate elements for closure, privacy, sun protection or screening (such as for example roller blinds, doors, gates or shutters) include a single-phase induction motor (or asynchronous motor) with a permanent split capacitor.

These actuators are powered by the alternating current mains, for example 230 V 50 Hz. They include an immobilization brake for locking the actuator when the motor is not supplied. This brake is preferably activated by the magnetic flux of the stator of the motor.

In frequent applications, the intensity of the load that the motor must drive varies substantially during the movement of the element. Therefore, in some applications, the driving force to be applied when the element reaches abutment is low relative to the force necessary to drive the element in other portions of the travel.

This is for example the case of roller blinds including a top abutment and/or a compression locking device for the blind curtain, or roller blinds simply coupled to the roller tube by flexible metal connections. When the blind reaches the top abutment, the blind curtain is almost totally rolled up. The suspended weight of the blind is therefore very small, as is the torque to be supplied by the motor in this zone. The motor is dimensioned to supply a torque at least greater than the maximum torque exerted by the curtain of the roller blind on the roller tube and therefore on the actuator. If the arrival at the abutment occurs without caution, the force generated by the actuator generates a high and unnecessary level of stress on the shutter curtain and/or on the abutment. It is therefore necessary to detect as early as possible an (even) slight increase in the load to be driven to stop powering the actuator as soon as possible to prevent unnecessary stresses. This is made difficult due to the complexity of the kinematic link connecting the motor to the bottom slat of the shutter curtain.

Conversely, when the bottom slat of the shutter curtain touches the ground during an unrolling motion, it is necessary to be able to stop powering the actuator as soon as the latter switches from a generator operation to a drive operation. If the blind is equipped with a locking device operating in compression, it is fairly easy to detect this change of operation by the detection of a sharp increase in the torque. On the other hand, if the shutter curtain is connected to the roller tube via flexible connections consisting of metal foils, the bending force of the foils when the actuator becomes the motor is too weak to be easily detected.

Patent FR 2 814 298 discloses a device for operating a movable element in a building comprising a direct current motor and in which, when the element comes close to an abutment, its speed is reduced in order to prevent considerable stresses on the drive train on reaching the abutment. This device requires a direct current motor and position sensors to determine when the speed of the element must be reduced.

Patent EP 0 671 542 discloses a device for operating a movable element in a building comprising an alternating current motor and in which, when the element comes close to an abutment, a capacitor is placed in series on the motor supply phase so as to limit the supply voltage. The speed reduction is detected by applying the voltage at the terminals of the permanent slip capacitor to a means powering a relay. This device requires the use of an electromagnetic brake powered independently of the capacitor. Specifically, under-powering the motor causes the immobilization brake to be released. An electromagnetic brake is a much more costly device than a brake directly activated by the stator flux of the motor. This device also requires the presence of a position sensor determining the position of the movable element in which the powering at reduced tension occurs.

Utility model DE 200 02 225 discloses a device for supplying an induction motor with a permanent split capacitor, in which two triacs are used to perform the functions of switches for controlling the raising or lowering of a movable element in a building.

Patent DE 43 07 096 discloses a device for powering an induction motor comprising two triacs each mounted in series with a winding of the motor. Controlling the states of these two triacs makes it possible to dispense with a startup capacitor or a permanent split capacitor.

U.S. Pat. No. 4,422,030 discloses a device for powering an induction motor that makes it possible, with the aid of a triac, to power a motor first at full voltage during its startup phase, then to supply the latter at reduced voltage.

U.S. Pat. No. 6,777,902 discloses a device for supplying an induction motor that makes it possible to operate a garage door. Depending on whether the motor drives the raising or the lowering of the garage door, the motor is supplied to provide a different power, the capacity value of capacitive means of phase difference between its windings being modified. The switches making it possible to connect the capacitive means of different values between the motor windings may be implemented by triacs.

Application EP 1 349 028 describes a device for operating a roller blind using an asynchronous motor. When the blind approaches an end of travel, the motor is controlled at reduced torque. This control may be achieved by limiting the supply voltage.

Application EP 0 808 986 describes a device for operating a garage door in which a three-phase motor is controlled to supply a torque that varies according to the load that it must drive. The motor windings are wired in a triangle and a switch S1 is provided in a branch of the triangle. This switch is opened to make the motor operate at reduced torque.

Application DE 39 33 266 describes a method for supplying at reduced torque the motor operating a movable element throughout a lowering phase of this movable element. The purpose of this supply is substantially to maintain equal lowering and raising speeds. However, this document does not explain how practically to achieve the torque limitation, in the case of an induction motor, unless it is by acting on the amplitude of the voltage. Acting on the amplitude of the wave suggests the use of a complex AC-AC converter, equivalent to a variable ratio transformer, or else (more likely) the use of a triac whose turn-on angle is greater than or much greater than 90°.

Reducing the maximum torque of the motor causes the significant reduction in the safety margin that is reflected by the difference between the operating torque and the maximum torque that the motor can supply. In a driven load operation, this safety margin is equal to the difference between the rated torque and the maximum torque that the motor can supply. In a driving load operation, the torque-speed characteristic is symmetrical relative to the point of synchronism (rotor speed=speed of synchronism, zero torque). The same safety margin is found. In one case as in the other, it is essential to maintain a sufficient safety margin.

The problem does not arise in the same manner for a direct current motor: in driven load, the motor torque increases in monotonic manner when the speed decreases (which automatically tends to stabilize the speed), and, in driving load, the resistant torque increases in monotonic manner when the speed increases (which also tends to stabilize the speed).

For an induction motor, if it happens that the maximum torque that the motor can supply is exceeded, it goes over to a zone of steadily decreasing torque as the distance from the speed of synchronism, in one direction as in the other, becomes greater. This situation is therefore potentially dangerous if, when raising or lowering, an accidental overload torque is added to the load torque. An example of accidental overload is a child who hangs onto a roller blind or an overhead door. The method described in this prior-art application does not take account of the danger present in such a situation.

The object of the invention is to provide a method for supplying an alternating current motor for driving a movable element that alleviates the aforementioned disadvantages and has improvements over the known methods of the prior art. In particular, the supply method according to the invention relates to an induction motor, makes it possible to reduce the stresses on the movable element and on its drive train when the latter arrives at the end of travel without a change in speed of the element being noticeable to the user and allows the activation of a brake using the magnetic flux produced by the stator of the induction motor. It makes it possible to maintain a sufficient safety margin to prevent the motor from operating in a zone in which its torque reduces with the absolute value of the difference existing between the speed of the rotor and the speed of synchronism. The invention also relates to an actuator making it possible to apply the method having these advantages.

The supply method according to the invention is defined by claim 1.

Different variants of the supply method according to the invention are defined by dependent claims 2 to 13.

The actuator according to the invention is defined by claim 14.

Various embodiments of the actuator are defined by claims 15 to 17.

The installation according to the invention is defined by claim 18.

The appended drawings represent, as an example, an embodiment of the actuator according to the invention and a mode of execution of the supply method according to the invention.

FIG. 2 is a graphic representing the curves reflecting the torque variations of a motor according to its rotation speed.

FIG. 3 is a flowchart of a mode of execution of the supply method according to the invention.

Figure 1:
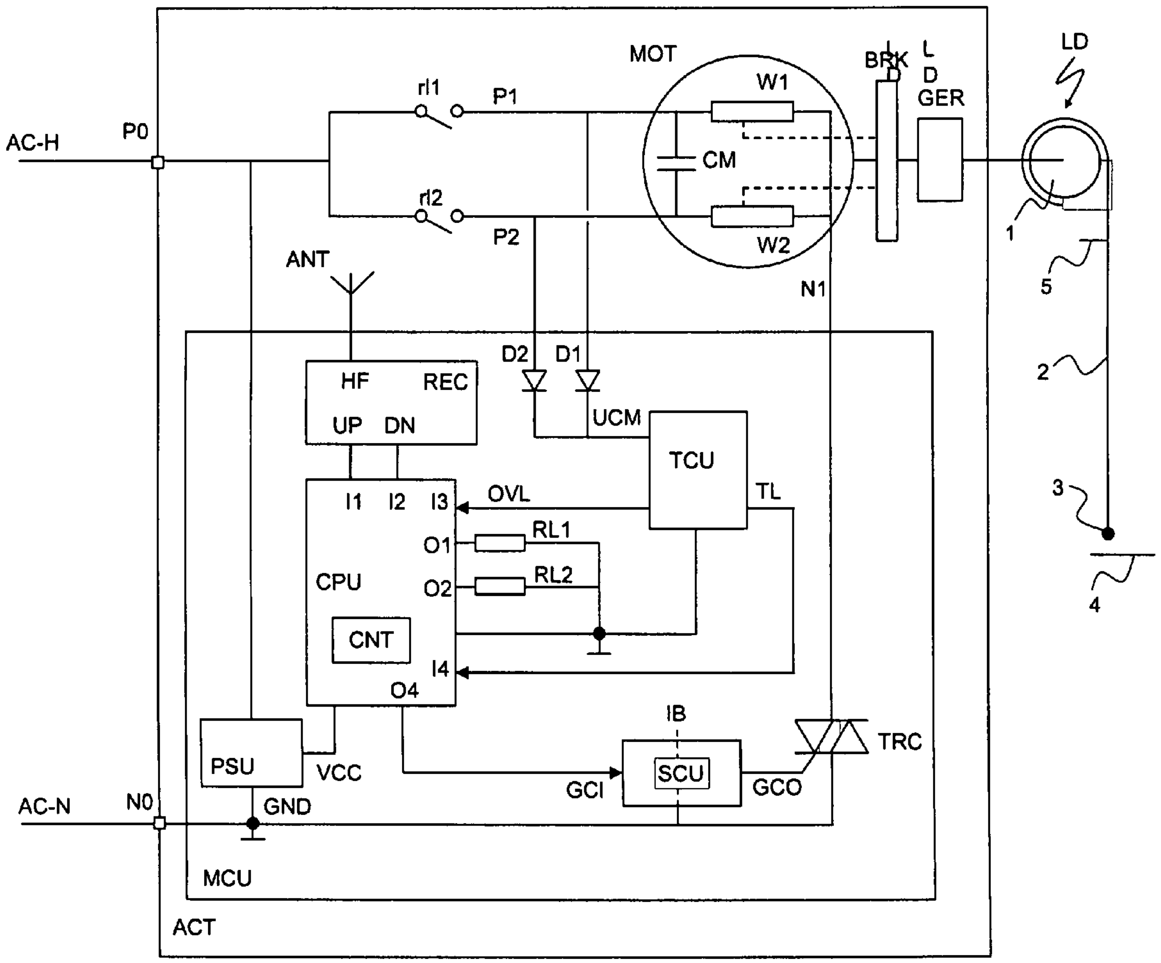
FIG. 1 is a diagram of an embodiment of an actuator according to the invention.

The actuator ACT shown schematically in FIG. 1 makes it possible to drive a movable element LD for closure, privacy or sun protection fitted in a building. This element may be moved in two opposite directions by rotation of an induction motor MOT in a first direction of rotation and in a second direction of rotation. The actuator is supplied by the electricity distribution network between a phase conductor AC-H and a neutral conductor AC-N. The movable element may for example be a roller blind comprising a shutter curtain 2 consisting of slats, that can be rolled up onto a roller tube 1 and having a bottom end 3 that can be moved between an extreme top position 5 and an extreme bottom position 4.

The motor MOT is of the induction type, single-phase, with a permanent split capacitor CM. It comprises two windings W1 and W2. Depending on the desired direction of rotation, the capacitor CM is placed in series with the first winding W1 or with the second winding W2. P1 and P2 indicate the connection points of the capacitor CM with each of the windings W1 and W2. The other two ends of the windings are connected to a point N1, itself connected to the neutral conductor AC-N via a triac TRC.

An immobilization brake BRK is associated with the motor MOT whose rotor it immobilizes in the absence of current in the windings. As shown by dashed line connections, the brake is coupled magnetically to each of the windings. When the rotor of the motor MOT rotates, it drives a reduction gear GER, whose output stage drives a shaft forming the mechanical output of the actuator. It should be noted that the connection between this output shaft and the movable element LD is not necessarily rigid.

The connection between the phase conductor AC-H and the windings W1 and W2 of the motor is achieved by means of two switches rl2 and rl2 controlled by an electronic control circuit MCU that comprises various means controlling the actuator, that is to say a means for receiving and interpreting received commands, a means for supplying the actuator and a means for disconnecting this supply either on command or when an abutment is detected. The two switches rl1 and rl2 have a common connection, connected to the phase conductor and a phase terminal P0 of the actuator. The other connections of the switches are respectively connected to the connection points P1 and P2.

The control of the controlled switches results from control commands transmitted by radio frequencies.

The electronic control circuit MCU comprises a processor unit CPU, such as a microcontroller. This circuit comprises a supply circuit PSU, typically a down-converter, of which one input is connected to the phase terminal P0 and the other input is connected to the neutral terminal N0 and is referred as the electric ground GND of the electronic control circuit. The output direct voltage VCC of the supply circuit supplies the processor unit CPU and, in a manner not shown, a radio frequency receiver REC.

This radio frequency receiver REC comprises an input HF connected to an antenna ANT, and two logic outputs UP and DN, respectively connected to two logic inputs I1 and I2 of the processor unit CPU. By means known to those skilled in the art, the radio frequency receiver interprets the received radio signal to generate, as appropriate, a high logic state on the first output UP and a high logic state on the second output DN, depending on whether the received signal includes a raise command or a lower command.

According to the state of an allocation table located in the memory of the processor unit CPU, an activation of the first input I1 generates a command to close the controlled switch rl1 while an activation of the second input I2 generates a command to close the controlled switch rl2.

A second state of the allocation table located in the memory of the processor unit has the reverse effect, the activation of the first input I1 generating a command to close the controlled switch rl2 while the activation of the second input I2 generates a command to close the switch rl1.

The processor unit comprises a first output O1 supplying a first relay coil RL1 and a second output O2 supplying a second relay coil RL2. These coils act respectively on a first relay contact being the switch rl1 and on a second relay contact being the switch rl2.

Depending on which relay coil is supplied, the motor MOT rotates in one direction or the other. This arrangement allows the processor unit to stop the motor even in the presence of a movement command given by the reversing switch. It also makes it possible to reverse, if necessary, the relation between each position of the reversing switch and each motor phase, depending on the state of the allocation table. This arrangement is useful when it cannot be predicted in advance which direction of rotation of the motor corresponds to raising (conversely lowering) once the product is installed.

Means other than relays can be used, for example triacs or transistors.

The electronic control circuit MCU comprises a torque control unit TCU that receives a voltage UCM originating from two diodes D1 and D2 whose anodes are respectively connected to the terminals P1 and P2 of the motor. This torque control module is furthermore connected to the electric ground formed by the common terminal GND. The voltage UCM is therefore referenced relative to this common terminal GND, and it is found that, as soon as one of the controlled switches rl1 or rl2 is closed, the voltage UCM correctly corresponds to the half-wave amplitude of the voltage at the terminals of the capacitor CM.

The torque control unit TCU, which may be supplied at the voltage VCC by the supply circuit PSU, delivers at the output a torque overload signal OVL connected to an input I3 of the processor unit CPU. In the figure, the third input I3 is of the logic type and the torque control unit TCU switches its overload output OVL to the high logic state if the torque exceeds a predetermined value and/or if the measured torque variation exceeds a predetermined value in a given time interval.

More precisely, the torque control unit TCU measures, as previously seen, a signal UCM that corresponds to the voltage at the terminals of the running capacitor CM. When the rotor slows, due to a higher resistant torque, this voltage reduces. It is therefore at least the decrease of this voltage in a given time interval that causes the overload output OVL to switch to the high state.

One embodiment of such a torque control unit is described in patent FR 2 806 850, with reference to FIG. 1, line 31 of page 4 to line 14 of page 6.

Alternatively, the torque control unit TCU may deliver an analog voltage on the overload output OVL and the third input I3 of the processor unit CPU is of the analog type. The study of the variations of this analog magnitude is then processed in the processor unit CPU.

In addition to this function, the torque control unit TCU may also cause an underload output TL to switch to the high state if the amplitude of the voltage at the capacitor terminals falls below a given threshold, which means that the torque has passed below a given threshold value. The underload output TL is connected to a fourth input I4 of the processor unit.

The processor unit finally comprises a third output O3 connected to the control input GCI of a triac control circuit SCU whose control output GCO is connected to the gate of the triac TRC.

The control circuit is also connected to the electric ground GND and to the neutral conductor, which allows it to be informed of the moments when the mains voltage is cancelled out and to use this information to generate a signal to control the state of the triac. The circuit contains, if necessary, an electric insulation IB between input and output, this insulation being intrinsically implemented if an optotriac is used.

When the control input is in the low state, the control circuit delivers to the control output GCO control pulses that make the triac conductive immediately after the mains voltage has become zero. Therefore, the motor is supplied at rated voltage with the whole sine wave of the mains voltage.

When the control input is at the high state, the control circuit delivers the control pulses of the state of the triac with a delay relative to the moments when the mains voltage is zero. Preferably, this delay is less than a quarter period (or 90° expressed in angular terms) of the mains voltage. This delay makes it possible to reduce the RMS supply voltage of the motor and consequently the maximum torque generated by the latter, while retaining a sufficient magnetic attraction for the immobilization brake BRK and while retaining at the running capacitor terminals a substantially sine wave voltage that can be used for measuring the variations in torque and/or speed of the motor MOT.

The RMS value of the reduced voltage is preferably less than 75% of the effective value of the rated voltage. Rather than applying one and the same delay to the positive half-waves and the negative half-waves of the mains voltage, it is possible to reduce the voltage only on the alternations with the same sign, so as to retain a full wave on the other alternations, which causes less disruption to the torque measurement circuit and/or the locking brake. The delay is for example applied only to the negative alternations. It is also possible to apply a delay of less than a quarter period on the positive half-waves and a delay greater than a quarter period on the negative half-waves.

Alternatively, the third output O3 can directly deliver the control signals of the triac gate if the processor unit CPU receives a signal of synchronization with the mains voltage on another input. This choice is the most economical. It also makes it possible to use the triac to stop the supply of the motor, rather than opening the controlled switches rl1 or rl2. Therefore, the contacts of these switches may have a low breaking power.

FIG. 2 represents the characteristic torque-speed curves of an asynchronous motor supplied at two voltages U1 and U2 of different effective values and the operating points of this motor depending on the loads that it must drive.

The curve TM-U1 represents, as a function of the motor rotation speed, the value of the torque generated by the motor when supplied at the rated voltage U1.

The curve TM-U2 represents, as a function of the motor rotation speed, the torque value generated by the motor when supplied at the reduced voltage U2.

The horizontal axis of the speeds corresponds to a zero torque.

The straight line TL1 represents the intensity of the maximum load to which the motor is subjected during a cycle of driving the movable element between the two abutments, bottom and top (in normal operating conditions).

The straight line TL2 represents a predetermined intensity of the load to which the motor is subjected at some points of the travel of the movable element.

The straight line TL3 represents the intensity of the minimum load to which the motor is subjected during a cycle of driving the movable element between the two abutments, top and bottom (in normal operating conditions).

For an induction motor, the motor torque TM is zero when the rotor rotates at the same speed as the rotating field generated by the alternating currents circulating in the motor windings. As usage dictates, this speed value is called the speed of synchronism NS and the relative difference between the rotor speed NR and the speed of synchronism NS is called the slip.

The maximum torque that can be supplied by the motor is proportional to the square of the RMS value of the supply voltage. FIG. 2 shows a maximum motor torque MAX2 at reduced voltage U2 that is half the maximum motor torque MAX1 obtained at rated voltage U1. In other words, the effective values of the supply voltages U1 and U2 have a ratio equal to $\sqrt{2}$. This ratio between the rated voltage and the reduced voltage may be obtained by delaying the control pulses of the triac by 90° relative to the moments when the mains voltage is zero.

The rated operating point P1 corresponds to the application of the maximum load TL1 when the motor is supplied at rated voltage U1. In these conditions, the speed of rotation of the rotor of the motor is NRR, which hereinafter is called the rated speed value. Rated slip is used to denote the slip at this point. In the applications covered by the invention, the rated slip is typically 10%, or even 20%, which is substantially higher than the slips usually tolerated in industrial applications where three-phase induction motors are used.

The object of the supply method according to the invention is to power the motor at reduced voltage in the periods where the rated power of the actuator is not necessary in order to prevent overstressing the drive train connecting the movable element to the motor.

According to the invention, the transition from a powering of the motor at rated voltage to a powering at reduced voltage in a motor powering phase is possible only if, despite this powering at reduced voltage, the motor speed does not reduce in this period (in normal operating conditions) below the rated speed NRR. The absolute slip value must also not exceed the rated slip value, which signifies that, when the load is driving, the speed of the rotor becomes greater than the speed of synchronism NS but must remain below a maximum speed value NRMAX such that NRMAX=NS+(NS−NRR).

In this manner, the transition from a powering of the motor at rated voltage to a powering of the motor at reduced voltage causes an imperceptible change of speed, which does not risk disrupting the user in the case where the transition takes place when the element is still a long way from the end-of-travel abutments and above all if the point of transition to reduced voltage is not located fixedly and repetitively. The method according to the invention is particularly advantageous if the actuator contains no motor shaft position sensor or if it is intended to be fitted to an installation that has no sensor sensing the position of the movable element. The fact that the absolute slip value does not exceed the rated slip also makes it possible to ensure that the motor operates in a zone in which its torque increases with the absolute value of the difference existing between the speed of the rotor and the speed of synchronism.

One and the same load does not generate the same torque at the motor, and depends on whether the load is driven or driving. In the case of a roller blind, if the load is driving, the friction forces are subtracted from the forces induced by the suspended weight of the blind, while, if the load is driven, the friction forces are added to the forces induced by the suspended weight of the blind, this phenomenon also being able to be accentuated or attenuated by the fact that the efficiency of the reduction gear GER may be substantially different depending on whether the load is driven or driving. It is possible, for example, to use a reduction gear with three epicylic planetary gears whose efficiency is greater than 70% when the load is driven and less than 60% when the load is driving. This efficiency difference may be obtained by acting on the parameters for defining the gear teeth of the wheels comprising the reduction gear and particularly by acting on the lengths of approach path and recess path on the lines of action. Therefore, the same maximum load situation results in the torque TL1 in driving load and in the torque TL3 in driven load, the absolute values of the torques being substantially different. For example, an installation comprising an actuator and a roller blind operated by this actuator may be such that the absolute value of the maximum torque exerted by the roller blind on the actuator motor when the latter is driving the roller blind is at least twice the absolute value of the maximum torque exerted by the roller blind on the motor when the latter is driven by the roller blind.

When the load is minimum (torque value TL3), it is found that, if the motor is supplied at rated voltage U1 and if the motor is supplied at reduced voltage U2, the operating points of the motor are close to and represented respectively by the point P3 and by the point P5. At these two operating points, the rotor speed of the motor is less than the maximum speed NRMAX. Therefore, the motor may be supplied at reduced voltage throughout the phase for lowering the movable element.

During a closing period of the movable element, the motor speed passes progressively from the speed corresponding to point P5 to the speed of synchronism NS. Once the movable element has reached the bottom abutment (and where necessary the slats that comprise it are stacked), the load torque becomes resistant, the operating point moves on the curve TM-U2 to the point P4. Irrespective of the nature of the abutment, the torque cannot exceed the value MAX2. The fact that the speed varies more sharply with the torque when the motor is supplied at reduced voltage U2 than when it is supplied at rated voltage U1 makes detection easier by the torque control unit TCU which then has greater sensitivity.

In the same manner, the device may also be used in a phase for raising a roller blind.

In this case, the motor is necessarily supplied at rated voltage U1 when raising starts. If the movable element is completely closed, the initial speed of the motor is the speed of synchronism NS, then this speed decreases progressively until it reaches NRR at the operating point P1 when the load is maximum, and finally the speed increases again when the load reduces.

When the movable element has reached a position such that the intensity of the load will no longer change in this phase beyond the value TL2, the motor is supplied at reduced voltage U2. This switching of the supply from rated voltage to reduced voltage may, for example, occur as soon as the motor torque passes below the torque threshold TL2. Such a switching causes a movement of the operating point of the motor from the point P2 to the point P4 as shown in FIG. 2.

The change of speed during this switching of supply is imperceptible to the user. This allows very low accuracy and/or allows deviations in the position of the movable element during this switching. Therefore, a simple timer may be used to set the moment of switching from rated voltage to reduced voltage. For example, depending on the heat state of the motor (cold or hot), the travel covered by the movable element in a given time interval is not the same, but this variation is of no consequence because the user does not perceive the moment when the latter takes place. The management of the switching point allowing arrival at abutment with greater precision of detection and the guarantee of a lower maximum motor torque is therefore achieved at less cost.

The condition to be observed in driven load is therefore that the latter generates a resistant torque TL2 that is lower than that corresponding to the rated speed NRR on the characteristic curve at reduced voltage TM-U2. This condition may be established by learning, or be predetermined in an equivalent manner, for example by setting a relative duration relative to the total duration of operation between the bottom and top abutments.

FIG. 3 describes a mode of execution of the supply method according to the invention.

In a first step 10, a user acts on a movement control command emitter to command a movement of the movable element.

In a test step 20, it is determined whether the action taken by the user is intended to command a movement to raise the movable element or a movement to lower the movable element.

If the action taken is intended to command a movement to lower the movable element, in a step 30, an electric supply of the motor is commanded at reduced voltage to make it rotate in a first direction causing a movement to lower the movable element.

In a test step 40, it is determined whether an abutment is reached by the movable element or whether a stop command is given. If this is not the case, the method loops to step 30. An abutment is detected, for example, by analyzing the torque and/or changes in the torque.

If this is the case, the motor supply is disconnected in a step 50 and the method loops to step 10.

If the action taken is intended to command a movement to raise the movable element, in a step 60, an electric supply of the motor at rated voltage is commanded to make it rotate in a second direction causing a movement to raise the element.

In a test step 70, it is determined whether a motor torque threshold value TL2 has been undershot.

If the result of the test is positive, in a step 80, an electric supply of the motor at reduced voltage is commanded to make it rotate in the second direction.

If the result of the test is negative, in a step 90, an electric supply of the motor at rated voltage is commanded to make it rotate in the second direction.

In a test step 100, it is determined whether an abutment has been reached by the movable element or whether a stop command has been given. If this is not the case, the method loops to step 70.

If this is the case, the method loops to step 50.

The test procedure of step 70 may simply consist in checking a value stored in a counter CNT that is incremented when the motor rotates in one direction and decremented when the motor rotates in the other direction and in comparing with a particular value, determined in a learning phase. In this case, step 60 may be omitted.

The particular value is a position value or preferably a time value that reflects, less accurately but sufficiently accurately, the position of the movable element.

In the case of a roller blind, this particular value may be determined in a learning phase in the following manner. The movable element is brought to a first end-of-travel position, the counter value is initialized, the motor is commanded to drive the movable element to a second end-of-travel position and the counter value is stored in a memory when the motor torque passes the threshold TL2 (below the threshold if the first end-of-travel position was the bottom position, and above the threshold if the first end-of-travel position was the top position).

If a voltage representative of the motor torque is available, the passing of a threshold value by the motor torque can be detected by this voltage passing a predetermined threshold. If the voltage at the terminals of the capacitor CM is used directly, the motor torque passing below a threshold value is detected by this voltage passing above a threshold value, this voltage increasing when the torque reduces.

If the torque control unit TCU allows, it is this unit itself that determines and indicates, at the underload output TL, when the torque value has become less than a torque value that is predetermined or acquired by learning.

The particular value of the counter may also be determined more simply based on a learning maneuver between the two end-of-travel positions. The particular value is calculated automatically as a fraction of the content of the counter corresponding to the total travel, using a predetermined coefficient.

The particular value may finally be determined by a particular action of the installer on the control means when he estimates that the roller blind passes a position in which only a small fraction of the travel remains to be run. The manufacturer indicates, in the installation manual for example, a percentage of travel for which it is known that the torque becomes less than the threshold TL2.

In any case, the value of the method lies in not requiring great accuracy on this particular value.

As a precaution, at the moment of switching from a total conduction mode to a reduced conduction mode, the processor unit takes no account of the signal delivered by the overload output OVL, so as not to cause an unwanted stop at that moment.

The invention has been described in the case of an actuator that is remotely radiocontrolled. It is clear that the antenna may be replaced by a coupling to the phase conductor for transmission of the commands by powerline carrier currents. Those skilled in the art may without difficulty use the invention in the case of a control called wire control, that is to say for which the actuator has two phase terminals, the command being determined by connecting one or other of these phase terminals to the phase conductor AC-H of the mains, for example by means of a manual inverter with two contact positions and one neutral position.

The invention claimed is:

1. A method for powering an alternating current induction motor (MOT) used to lower or raise a movable element (LD) for closure, privacy, sun protection or screening in a building, by means of a reduction gear (GER) having a substantially different efficiency depending on whether the movable element drives or is driven by the motor, the movable element (LD) comprising a bottom end whose movements between an extreme bottom position and an extreme top position are caused by rotary movements of the motor (MOT), the electric motor being powered, in some periods, at reduced voltage, wherein the absolute value of slip of the motor, measuring the relative difference of speed relative to the speed at zero torque, remains less than the absolute value of slip of the motor when its rotor rotates at rated speed, at least so long as the movable closure element does not encounter an obstacle, the rated speed being defined as the speed of the rotor of the motor when the latter is powered at rated voltage and when the movable element exerts a maximum load.

2. The powering method as claimed in claim 1, wherein the motor (MOT) is powered at reduced voltage to cause the movements for moving the bottom end of the movable element toward the extreme bottom position.

3. The powering method as claimed in claim 1 wherein the motor (MOT) is powered at rated voltage to cause the movements for moving the bottom end of the movable element (LD) toward the extreme top position so long as a particular condition is not met, and in that the motor (MOT) is powered at reduced voltage to cause the movements for moving the bottom end of the movable element (LD) toward the extreme top position when the particular condition is met.

4. The powering method as claimed in claim 3, wherein the particular condition is the motor torque passing below a threshold.

5. The powering method as claimed in claim 3, wherein the particular condition is predetermined by fixing a relative duration relative to the total duration of operation between the extreme positions.

6. The powering method as claimed in claim 3, wherein the particular condition is determined in a learning phase.

7. The powering method as claimed in claim 6, wherein the particular condition is defined as a particular value calculated as a fraction of the content of a counter corresponding to the total travel, using a predetermined coefficient.

8. The powering method as claimed in claim 6, wherein the particular condition is determined by a particular action on control means when the movable element passes a position in which only a small fraction of the total travel remains to be traveled.

9. The powering method as claimed in claim 7, wherein a value of a position counter is stored in a memory when the motor torque passes the threshold during a movement between the extreme end-of-travel positions.

10. The powering method as claimed in claim 1, wherein the particular condition is the bottom end of the element reaching a position defined by a period of activation of the motor from one of the extreme positions of this end.

11. The powering method as claimed in claim 1, wherein the motor (MOT) is supplied through a triac (TRC) whose state is controlled by a control device (SCU) generating electric pulses at a frequency that is double that of the supply voltage, these pulses being generated substantially at the moments when the supply voltage is zero, to supply the motor at rated voltage, and substantially after the moments when the supply voltage is zero, to supply the motor at reduced voltage.

12. The powering method as claimed in claim 11, wherein, to supply the motor at reduced voltage, the electric control pulses generated by the control device (SCU) have a delay relative to the moments when the supply voltage is zero that differs depending on whether the supply voltage value is positive or negative.

13. The powering method as claimed in claim 1, wherein the RMS value of the reduced voltage is less than 75% of the RMS value of the rated voltage.

14. An actuator (ACT) comprising an alternating current electric motor (MOT) used to operate a movable element (LD) for closure, privacy, sun protection or screening in a building, by means of a reduction gear (GER) having a substantially different efficiency depending on whether the movable element drives or is driven by the motor, the motor being powered by a source of alternating voltage through a triac (TRC), which actuator comprises hardware means (TCU, CPU, SCU) and software means for implementing the method according to claim 1.

15. The actuator as claimed in claim 14, wherein the alternating current electric motor (MOT) is single-phase, of the induction type with two windings (W1, W2) and a permanent split capacitor (CM).

16. The actuator as claimed in claim 14, wherein the reduction gear (GER) has an efficiency greater than 70% when the movable element is driven by the motor and less than 60% when the movable element drives the motor.

17. The actuator as claimed in claim 14, wherein the reduction gear (GER) has an efficiency when the movable element is driven by the motor at least 15% greater than the efficiency when the movable element drives the motor.

18. An installation comprising an actuator (ACT) as claimed in claim 14 operating a movable element (LD), wherein the absolute value of the maximum torque exerted by the movable element on the motor when the latter drives the movable element is at least twice as much as the absolute value of the maximum torque exerted by the movable element on the motor when the latter is driven by the movable element.

* * * * *